Oct. 14, 1941.     H. A. HADLEY     2,258,648
UNDERSTRUCTURE FOR WEIGHING SCALES
Filed Feb. 16, 1939     4 Sheets-Sheet 1
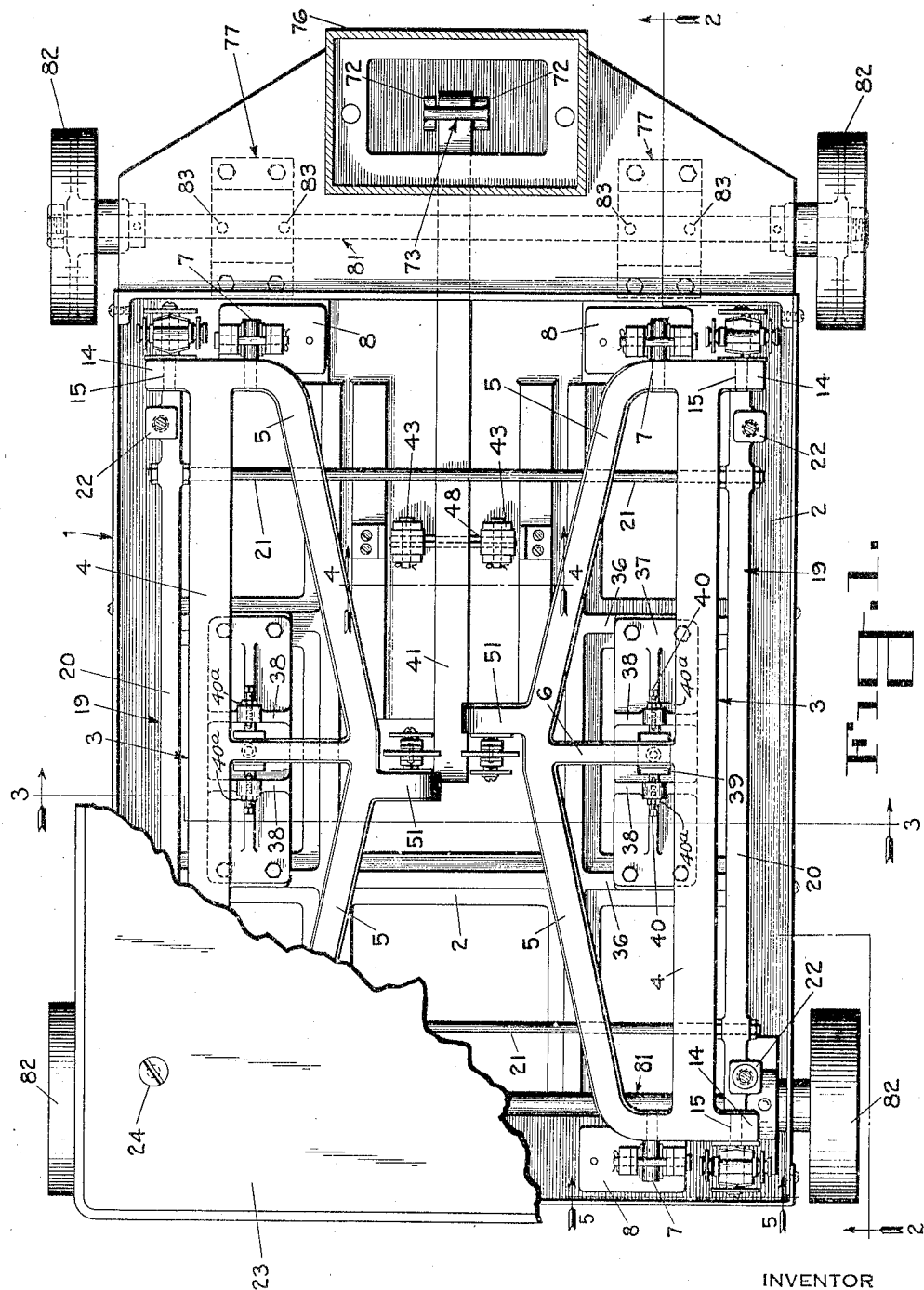
INVENTOR
Harlan A. Hadley
BY
ATTORNEY Oct. 14, 1941.  H. A. HADLEY  2,258,648
UNDERSTRUCTURE FOR WEIGHING SCALES
Filed Feb. 16, 1939  4 Sheets—Sheet 2
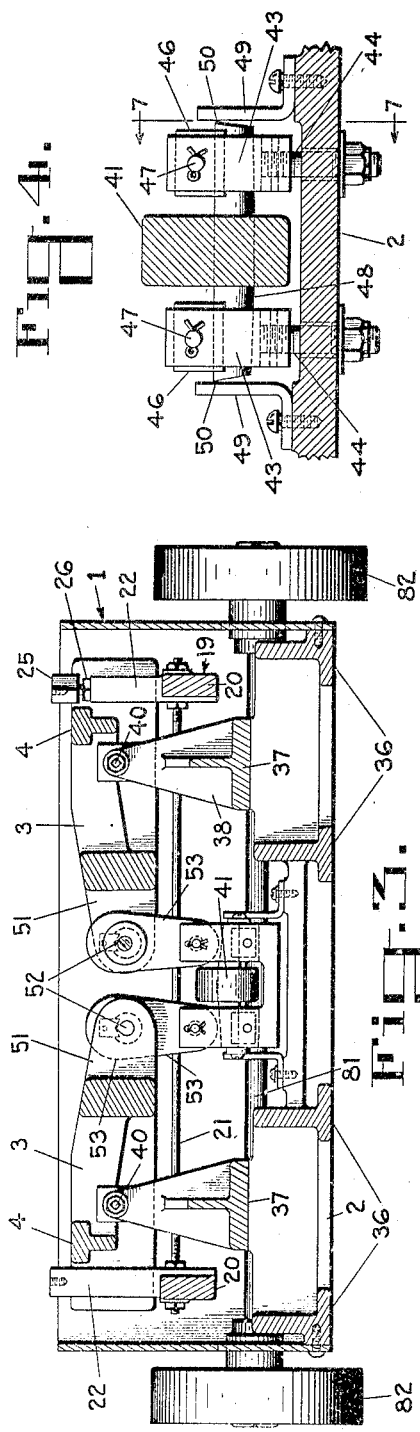
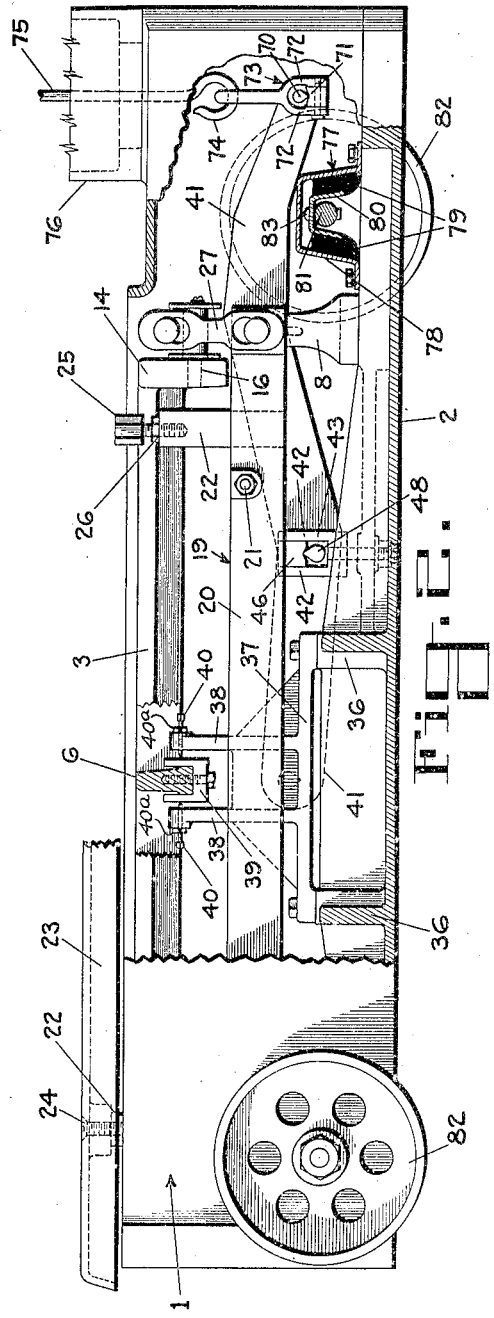
INVENTOR
Harlan A. Hadley
BY
ATTORNEY Oct. 14, 1941.     H. A. HADLEY     2,258,648
UNDERSTRUCTURE FOR WEIGHING SCALES
Filed Feb. 16, 1939     4 Sheets—Sheet 3
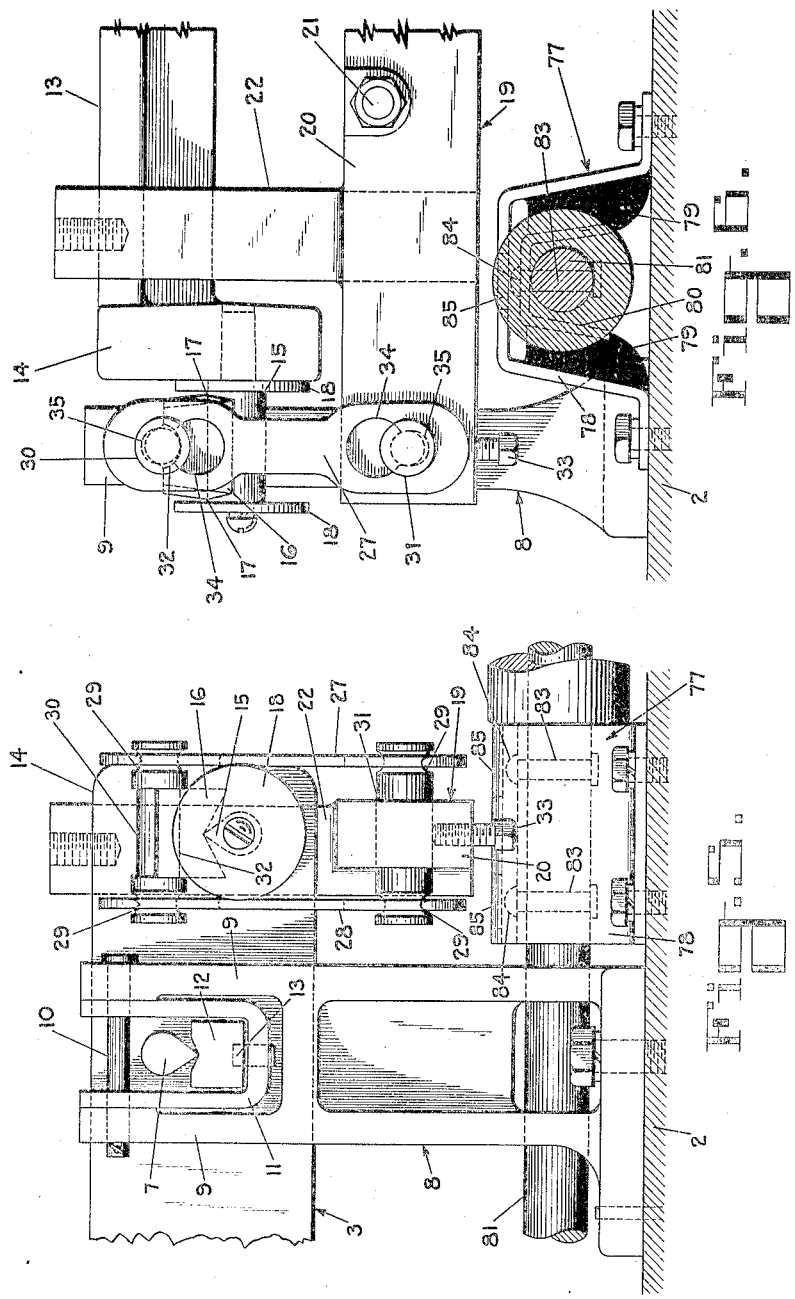
INVENTOR
Harlan A. Hadley
BY
Franklin T. Frisbee
ATTORNEY

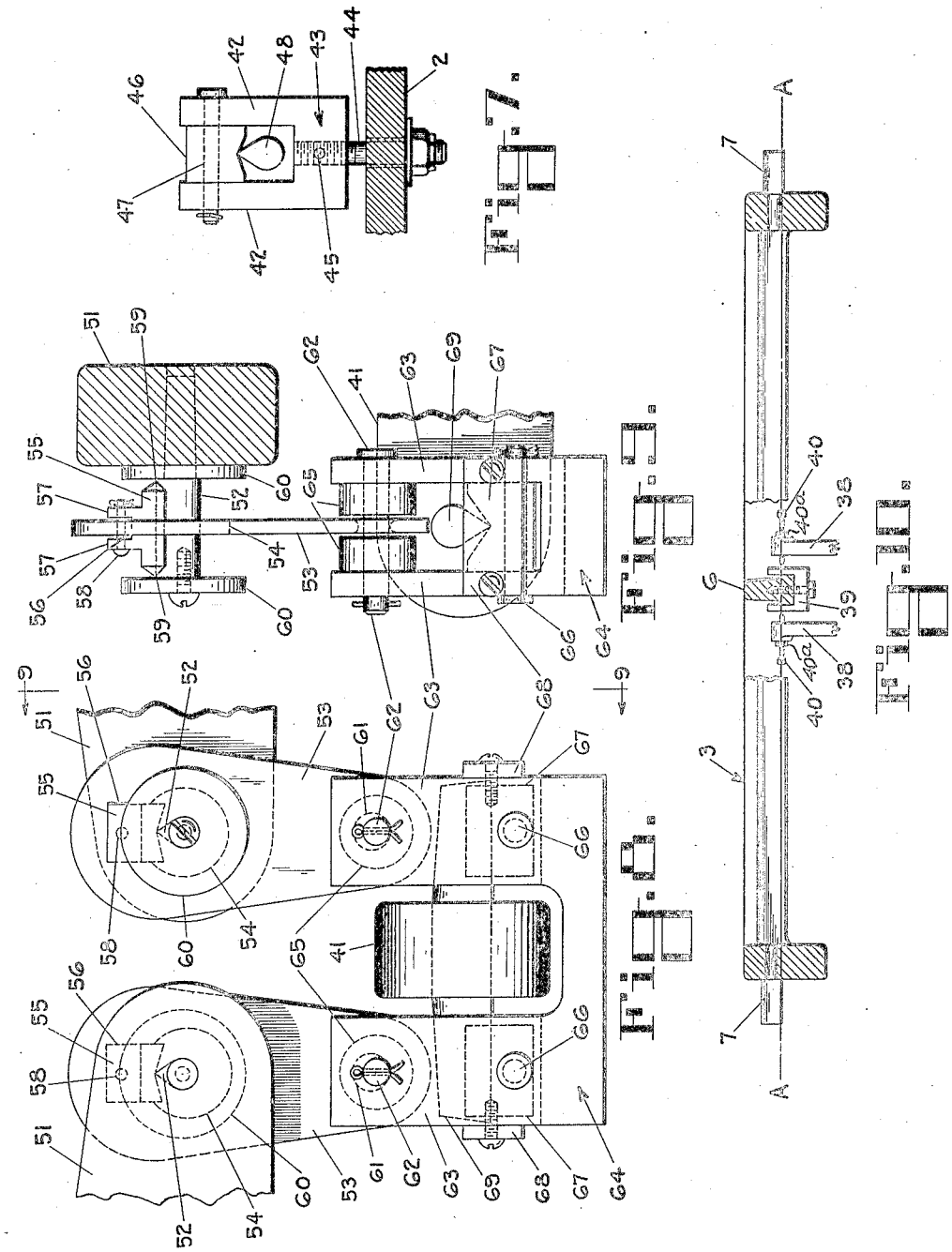

Patented Oct. 14, 1941

2,258,648

UNITED STATES PATENT OFFICE 2,258,648

UNDERSTRUCTURE FOR WEIGHING SCALES

Harlan A. Hadley, St. Johnsbury, Vt., assignor to Fairbanks, Morse and Company, Chicago, Ill., a corporation of Illinois Application February 16, 1939, Serial No. 256,691

8 Claims. (Cl. 265—71)

This invention relates to understructures for weighing scales of the portable type.

One of the objects of this invention is to provide means for maintaining the position of the main levers by employing adjustable means in axial alignment with the fulcrum pivots of the levers thereby reducing misalignments and friction to a minimum.

Another object is to provide yielding self-aligning bearings at all operative points of the lever system whereby any binding or excess friction of the co-operative parts under stress is obviated.

Another object is to provide linkage means for yieldingly suspending the platform supporting frame from the load pivots of the main levers, whereby the frame is permitted to automatically align itself under stress of the load or otherwise, together with means for readily assembling the linkage in position on the load pivots and the platform frame.

Another object is to provide a base casting on which all the relative parts are fixed, thereby maintaining the correct relationship of the mechanisms.

In order that the nature of my invention may be fully understood I have illustrated certain embodiments of the invention in the accompanying drawings, in which:

Figure 1 is a top plan view with a portion of the platform removed, showing a preferred embodiment of my invention.

Figure 2 is a longitudinal elevation on the line 2—2 of Fig. 1, showing a portion of the platform and side wall of the scale base housing.

Figure 3 is a cross section on the line 3—3 of Fig. 1, showing the connections of the main levers to the extension lever.

Figure 4 is a cross section on the line 4—4 of Fig. 1, showing the fulcrum mounting and support of the extension lever.

Figure 5 is an enlarged fragmentary front view on the line 5—5 of Fig. 1, showing the fulcrum and load pivots of one of the main levers together with the suspension links for the scale platform.

Figure 6 is an enlarged side view of the parts illustrated in Fig. 5, showing particularly the platform suspension links and the platform supporting frame and supports.

Figure 7 is an enlarged side elevation of one of the fulcrum pivots and co-operating parts of the extension lever on the line 7—7 of Fig. 4.

Figure 8 is an enlarged fragmentary front view of the connections of the extension and main levers.

Figure 9 is an enlarged side view of the lever connections on the line 9—9 of Fig. 8.

Figure 10 is a longitudinal elevation, partly in section, of one of the main levers showing graphically the axial alignment on the line A—A of the fulcrum knife edge pivots of the main lever with the pointed ends of the check screws co-operating with the center web of the lever in maintaining the main lever constantly at its fulcrum point in its original position.

Referring to the drawings, 1 designates the scale base housing, in which is located a fixed base plate 2 upon which all the related, operative parts of the understructure mechanisms are mounted. Disposed longitudinally within the housing are two opposed main levers 3 (Fig. 1) formed with an elongated bar 4 and arched arms 5 extending therefrom and joined by a center cross web 6, while adjacent to each butt end of the main levers is inserted a laterally extending fulcrum knife edge pivot 7. Mounted on the base plate 2 are longitudinally spaced fulcrum stands 8 (Figs. 1, 5 and 6), each of which is provided at its upper end with spaced upright arms 9 having a transverse pin 10 inserted therein, on which is swivelly mounted a U-shaped loop 11 (Fig. 5) carrying a hardened steel bearing block 12 pivotally mounted on a pin 13 fixed in the bottom of the loop 11, forming a self-aligning fulcrum pivot bearing, and in which bearing block is seated the fulcrum knife edge pivot 7 of the main lever 3.

Leading from each butt end of the main levers 3 is an extension 14 in which is inserted a laterally extending load knife edge pivot 15 seated in a hardened steel bearing block 16 mounted thereon (Figs. 5 and 6), which has pointed ends 17 adapted to engage spaced inner and outer friction plates 18 fixedly mounted on the pivot 15.

Located below the main levers 3 is a platform supporting frame 19 (Figs. 1, 2, 5 and 6) which is formed with side bars 20 and end connecting rods 21 bolted thereto and forming a rigid structure, upon the side bars of which are positioned vertical supports 22 adapted to support the platform 23 secured to the supports by screws 24. Means for leveling the platform comprises an adjusting screw 25 (Figs. 2 and 3) having a threaded opening in the head, the shank of the screw being inserted in one of the platform supports 22, while in the threaded opening in the head of the adjusting screw 25 a platform screw 24 is inserted (Fig. 2), and a lock nut 26 serves to lock the adjusting screw in its adjusted position. The platform supporting frame 19 is suspended from the load knife edge pivots 15 by linkage comprising spaced links 27 and 28 mounted in annular grooves 29 at the ends of upper and lower spaced suspension pins 30 and 31 (Figs. 5 and 6), the body of the upper pin 30 being mounted in a concaved groove 32 on the top of each load bearing block 16 and forming a self-aligning load bearing, while the lower pin 31 is inserted in the end of the co-operating side bar 20 of the platform supporting frame 19 and held in a fixed position therein by a set screw 33. The links 27 and 28 are provided at each end with an enlarged circular entrance opening 34, from which extends a reduced seating opening 35, in which the suspension pins 30 and 31 are seated by engagement with the annular grooves 29 therein. By employing this particular linkage for suspending the platform from the load pivots the platform is permitted to automatically align itself under stress of the load or otherwise, while the assembling and operation of the co-operating parts are facilitated by permitting the ends of the pins 30 and 31 to be readily inserted in the associated entrance openings 34 and then introduced to the seating openings 35.

In order to prevent the main levers 3 from shifting out of position and to provide means for maintaining them in their original positions with the least amount of friction there is fixedly mounted on an upright support 36 integral with the base plate 2 a vertical stand 37 provided with spaced upright arms 38 (Figs. 1 and 2). Attached to the center cross web 6 of the main lever is a downwardly extending U-shaped hardened steel block 39, which is positioned between the upright arms 38, in which are inserted hardened steel round-pointed check screws 40 (Figs. 1, 2, 3 and 10) adapted to extend toward the sides of the block 39 and to contact them when the main lever is even slightly displaced longitudinally under any stress, thereby checking and controlling the movement of the main levers longitudinally. A slight clearance is left between the rounded points of the check screws 40 and the sides of the block 39 so as to allow sufficient free play for the levers under any stress. A suitable lock-nut 40a is provided on each screw 40, for maintaining the screw in any adjusted position. The points of the check screws 40 are positioned and always maintained in axial alignment with the knife edges of the spaced fulcrum pivots 7 as indicated by the line A—A of Fig. 10, and this point being the fulcrum point and consequently the point of rotation of the main levers, the main levers 3 thus are checked within a restricted area and friction is reduced to a minimum.

The extension lever 41 co-operating with the weight indicating mechanism (not shown) is fulcrumed between the spaced upright arms 42 of U-shaped standards 43 (Figs. 1, 2, 4 and 7), which are attached by screws 44 to the base plate 2 and are held in a fixed position by a pin 45. Between the arms 42 of each standard 43 a hardened steel bearing block 46 (Figs. 2 and 7) is pivotally mounted on a pin 47, which is held in position by a cotter pin inserted in one end, while an elongated knife edge pivot 48 carried by the extension lever 41 (Fig. 4) is seated in the spaced bearing blocks 46 disposed above and extends between spaced angle plates 49. The ends of the knife edge pivot 48 are beveled and have a tip 50, which with a slight clearance cooperates with its respective angle plate 49 and forms therewith a fulcrum point presenting a reduced frictional area.

In order to transmit the weight of the load on the platform to the extension lever 41 and hence to the weight indicating mechanism, each of the main levers 3 is provided with a nose extension 51 (Figs. 1 and 3), in the end of which is inserted a laterally extending knife edge pivot 52. Suspended from each pivot 52 is a depending connecting link 53 (Figs. 8 and 9) having in its upper end an enlarged circular opening 54, through which extends a bearing block 55 seated in a rectangular bearing opening 56 leading from the opening 54 and provided with upright spaced arms 57 by which the bearing block is pivotally mounted in the co-operating connecting link on a pin 58 carried by the link. The pivotally mounted bearing block 55 is seated on the co-operating knife-edge pivot 52 below forming a self-aligning bearing and is provided with pointed ends 59 adapted to engage inner and outer friction plates 60 fixedly mounted on the pivot 52, whereby friction of the co-operating parts is greatly reduced. The lower end of each link 53 is provided with an enlarged circular opening 61, through which extends a pin 62 freely movable therein and inserted in the upper ends of opposed pairs of spaced upright arms 63 of a U-shaped hanger 64, on which are mounted circular spacers 65 adapted to hold the link in the center of the pin 62. Mounted between the lower ends of each pair of spaced arms 63 on a pin 66 carried thereby is a hardened steel bearing block 67, in which bearing blocks is seated an elongated knife edge pivot 69 located below and inserted in the inner end of the extension lever 41 and provided with beveled ends engaging friction plates 68 attached to the arms 63, thereby transmitting the weight of the load to the extension lever and hence to the indicating mechanism (not shown). Self-aligning bearings at all operative points obviate any binding of the co-operative parts.

The outer end of the extension lever 41 (Figs. 1 and 2) is provided with a knife-edge pivot 70 (Fig. 2) which is seated in a hardened steel bearing block 71 secured in the spaced arms 72 of a loop 73, which is mounted on the hooked end 74 of the steelyard rod 75 extending upwardly through the pillar 76 to the weight indicating mechanism above. The scale base housing 1 is provided on each side with spaced resilient or cushioned mountings 77 (Figs. 1, 2 and 6) attached to the base plate 2 and comprising an inverted U-shaped bracket 78 having attached to its inner sides cushions of resilient material 79, preferably rubber, in which is imbedded an inverted inner U-shaped plate 80. Extending transversely of the base plate and through each opposed pair of cushioned mountings 77 (Fig. 1) is an axle shaft 81 carrying wheels 82 secured to its ends, the shaft 81 being fixedly mounted in each co-operating cushion bearing 77 by means of spaced bolts 83 (Figs. 5 and 6) inserted in the shaft and the top of the inner plate 80, the heads 84 of the bolts being positioned below openings 85 in the top of the bracket 78 in order to permit the bolt heads to enter therein and consequent unrestricted yielding of the shaft under stress. By employing this means of resiliently mounting the axle shafts 81 the rubber cushions absorb any shock when the scale is being moved and thus relieve the weighing mechanism from any shock or excessive stress when moved or otherwise.

While I have shown a preferred embodiment of my invention it is evident that changes and modifications in the construction herein shown and described may be made that would come within the scope thereof and it is not intended, therefore, to limit the invention to the precise details of construction shown.

I claim:

1. In a weighing scale, a plurality of fulcrum stands provided with fulcrum bearings, opposed main levers having spaced fulcrum pivots fulcrumed in the said bearings, and means independent of said fulcrum pivots and located intermediate the ends of the main levers, in axial alignment with the fulcrum pivots thereof, for maintaining the position of the main levers.

2. In a weighing scale, a plurality of spaced fulcrum stands having spaced fulcrum bearings therein, opposed main levers carrying fulcrum pivots fulcrumed in the said fulcrum bearings and formed with an elongated bar, arched arms extending therefrom and a center cross web, and means located below the center cross web provided with opposed check members in axial alignment with the said fulcrum pivots and adapted to co-operate with the said center cross web in limiting axial movement of the main levers.

3. In a weighing scale, a plurality of spaced fulcrum stands having spaced fulcrum bearings therein, opposed main levers carrying fulcrum pivots fulcrumed in the said fulcrum bearings and formed with an elongated bar, arched arms extending therefrom and a center cross web, a block attached to the cross web, a stand mounted below the center cross web, provided with upright spaced arms spanning the said cross web and block carried thereby, and a pointed adjustable check screw inserted in the upper end of each upright arm, the point of which is in axial alignment with the fulcrum points of the fulcrum pivots.

4. In a weighing scale, a plurality of spaced fulcrum stands having spaced fulcrum bearings therein, opposed main levers carrying fulcrum pivots fulcrumed in the said fulcrum bearings and formed with an elongated bar, arched arms extending therefrom and a center cross web, means located below the center cross web provided with opposed check members in axial alignment with the said fulcrum pivots and adapted to co-operate with the said center cross web in limiting axial movement of the main levers, and means for locking each of the said check members in their adjusted positions.

5. In a weighing scale, a plurality of fulcrum stands, opposed main levers pivotally mounted in the fulcrum stands, spaced load pivots located at the butt ends of the main levers, a load supporting frame provided with spaced lower suspension pins at each side thereof, a load bearing block mounted on each load pivot, an upper suspension pin carried by each load bearing block and provided with an annular groove at each end, and spaced links pivotally mounted on and connecting the said upper and lower suspension pins, the spaced links being provided at each end with an enlarged entrance opening for guiding the co-operating suspension pin therein and a reduced seating opening leading from each of the enlarged openings in which the link is subsequently seated in the annular grooves of the said pins, whereby the load frame is pivotally suspended from the main levers.

6. In a weighing scale, a plurality of fulcrum stands, opposed main levers pivotally mounted in the fulcrum stands, means for transmitting the weight of the load from the main levers to the indicating mechanism including an inwardly extended portion on each main lever provided at its end with a transversely extending pivot, an extension lever fulcrumed in an upright stand and provided at its inner end with an elongated transversely extending pivot, opposed depending links pivotally suspended from a bearing block mounted in the upper end of each link and seated on the transverse pivot of the co-operating main lever extended portion, and a U-shaped connector hanger provided with opposed pairs of upright connector arms carrying a transverse pin on which the lower end of its co-operating link is pivotally mounted between spacers, while below the pin is pivotally mounted a bearing block in which the co-operating extension lever pivot is seated, whereby the linkage and co-operating parts are yieldably self-aligning.

7. In a weighing scale, a plurality of fulcrum stands, opposed main levers mounted in the fulcrum stands, and means for transmitting the weight of a load from the main levers to indicating mechanism, said means comprising opposed, inwardly directed extensions on the main levers, each extension supporting a pivot, an extension lever fulcrumed intermediate its length, in a stand, and provided near its inner end with an elongated, transversely directed pivot, a pair of independent link elements, a bearing block pivotally supported near the upper end of each link and adapted for engagement with the pivot of one of the lever extensions, means on each of said lever extension pivots, provided for retaining the bearing block and link associated therewith against movement longitudinally of the pivot, a unitary hanger member providing spaced, upstanding arms, means pivotally connecting the lower ends of said link elements to said arms, and bearing blocks pivotally supported by said hanger arms, adapted for pivotal engagement with the elongated pivot on said extension lever.

8. In a weighing scale, a plurality of fulcrum bearing stands, opposed main levers having fulcrum pivots adapted to be fulcrumed in said bearing stands, each of said stands including spaced upstanding arms, a pivot element spanning said arms, a U-shaped member pivotally suspended on said pivot element and confined against lateral movement by said arms, and a fulcrum bearing mounted on said U-shaped member for pivotal movement thereon, about an axis normal to the pivotal axis of said member, said bearing providing a fulcrum seat for one of the lever fulcrum pivots.

HARLAN A. HADLEY.